United States Patent [19]

Lewis

[11] Patent Number: 4,657,042
[45] Date of Patent: Apr. 14, 1987

[54] PRESSURE MODULATION DEVICE FOR HYDRAULIC SYSTEMS
[75] Inventor: Thomas F. Lewis, Erie, Pa.
[73] Assignee: Snap-Tite, Inc., Union City, Pa.
[21] Appl. No.: 849,003
[22] Filed: Apr. 7, 1986
[51] Int. Cl.$^4$ ............................................. F16K 31/12
[52] U.S. Cl. ............................. 137/505.13; 192/109 F
[58] Field of Search ............. 137/494, 505.13, 505.14, 137/505.15; 192/109 F

[56]  References Cited
U.S. PATENT DOCUMENTS 3,583,422  6/1971  Dach ........................ 137/505.14 X
3,722,646  3/1973  Oguma ...................... 137/505.14 X
3,828,807  8/1974  Dawes ....................... 137/505.14 X
4,086,994  5/1978  Hirosawa .................. 137/505.14 X
4,265,346  5/1981  Emmadi ........................ 137/505.13

Primary Examiner—Robert G. Nilson
Attorney, Agent, or Firm—Woodling, Krost & Rust

[57] ABSTRACT

A pressure modulation valve, for supplying a smooth pressure increase, having desired characteristics, to a load port in a hydraulic control system. A single spool provides initial and final bypass phases of rapid pressure rise, and an intermediate modulated phase. The pressure characteristics can be adjusted by varying the loads and openings.

7 Claims, 5 Drawing Figures

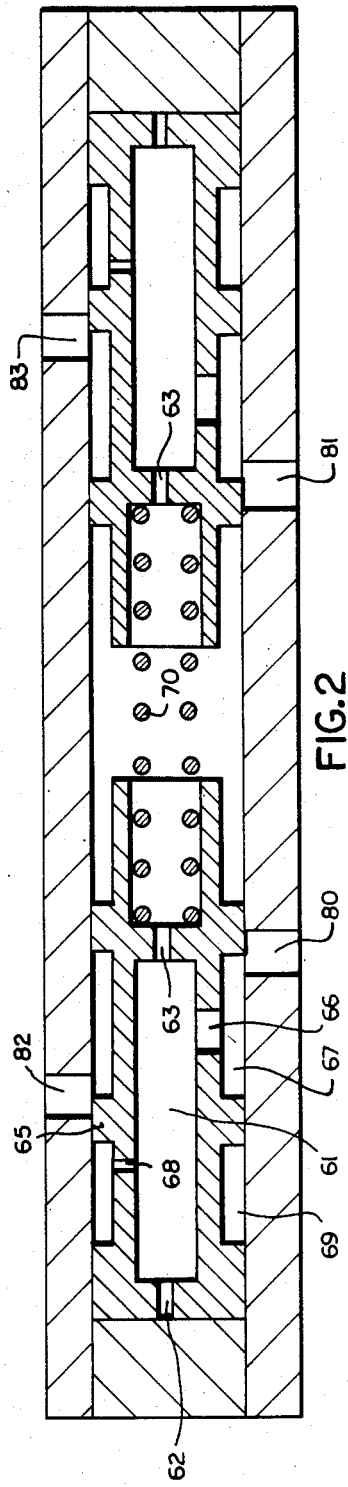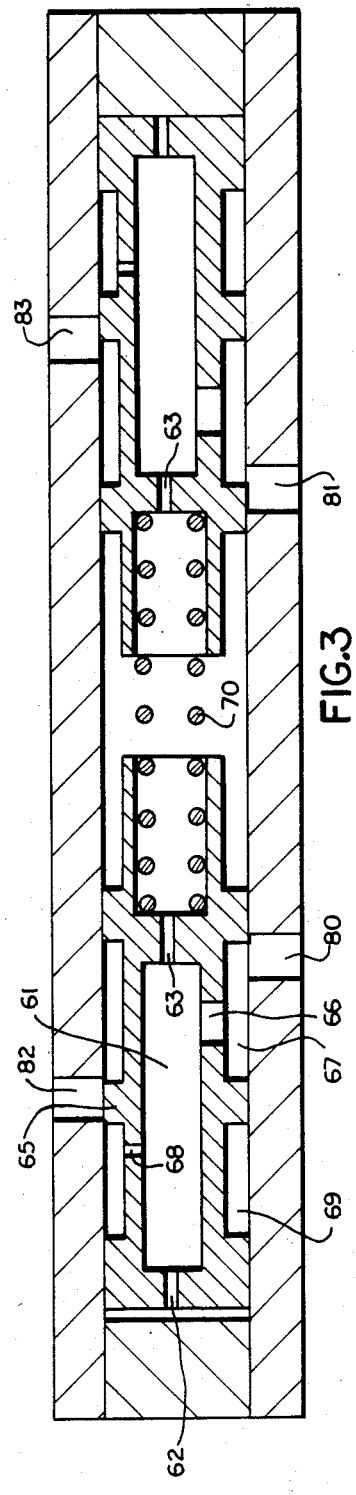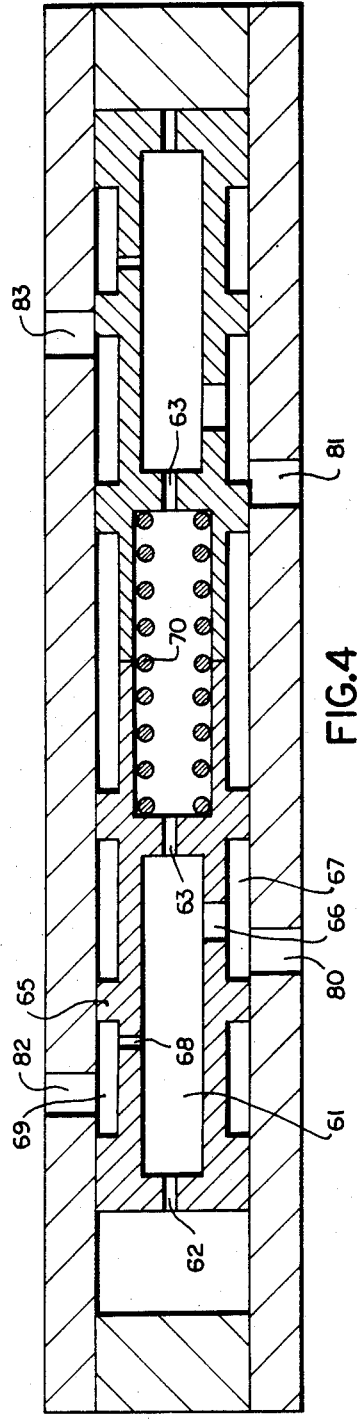

PRESSURE MODULATION DEVICE FOR HYDRAULIC SYSTEMS

This invention relates to valves for hydraulic systems. In particular, it relates to improvements in pressure modulation systems for the control of clutches and the like.

BACKGROUND AND SUMMARY OF THE INVENTION

A problem in hydraulically controlled transmissions is the need to achieve a smooth rise in pressure at the clutch. This has been a major concern which has resulted in electronic and hydraulic systems of both high cost and complexity. It would be highly desirable to be able to achieve control over pressure application in a more simple, compact, and economical way than heretofore.

One commonly used means for smoothing hydraulic pressure rise has been by the use of a spool-controlled pressure modulation valve between directional control valves and the clutch. Previous modulator valves have typically been composed of separate spool valves, one "accumulator valve" primarily responsive to pressure in a "pressure-absorbing" fashion, and another which serves as a separate directional control, permitting the clutch or other load to be bypassed, at least to some extent, while the accumulator valve is responding. In the modulator valve of my invention, a single spool serves the function of a bypass control and carries the time delay function achieved by the accumulator valve of the prior art. This design makes possible more economical manufacture of both the valves and valve bodies.

The modulator spool of the present invention provides three separate phases of modulation which are defined by its movement in the modulation process. The modulated pressure curve, that is, the pressure output to its load port as a function of time, may be shaped and timed by features in the device which affect it in predictable ways.

Accordingly, an object of the invention is to provide a pressure modulation device for hydraulic systems which device is simple, compact, and economical to manufacture.

A further object of the invention is to provide such a device which is readily adaptable to many applications.

Other more specific objects of the invention will be set forth in the description to follow of a preferred embodiment, and in the claims appended hereto and drawings, in which FIG. 1 is a side elevational view in cross-section of the presently preferred embodiment;

FIG. 2 is a diagrammatic view of the preferred embodiment in a first position;

FIG. 3 is a diagrammatic view of the preferred embodiment in a second position; and FIG. 4 is a diagrammatic view of the preferred embodiment in a third position.

DESCRIPTION OF A PREFERRED EMBODIMENT OF THE INVENTION

Figure 1A:
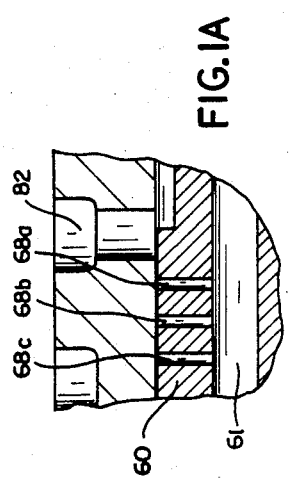
FIG. 1A is a fragmentary section of an alternate embodiment.
Figure 1:
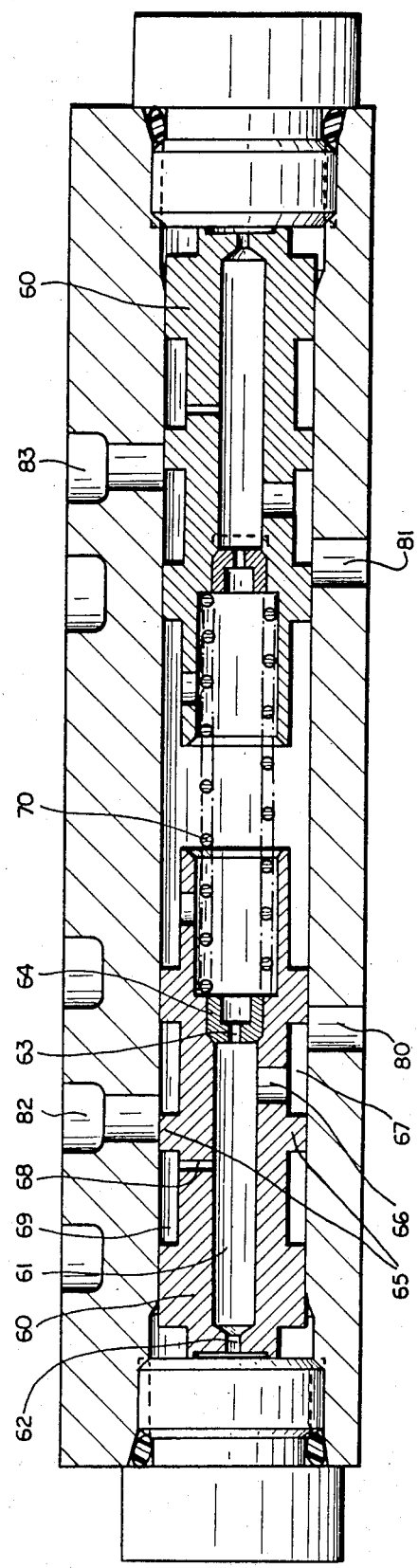

FIG. 1 shows a preferred form of a dual pressure modulation control system of my invention, in which two spools, each modulating pressure to a different port, are contained in a single bore. Input pressure port 80 or 81 receives high pressure fluid, while the other input pressure port is connected to tank or reservoir. Both connections are typically via a directional control valve. The function of each modulating spool 60 is to respond to a sudden application of pressure at its associated input port 80 or 81 in such a manner that the pressure delivered to its load port 82 or 83, respectively, rises smoothly, and if possible, has a desired characteristic with respect to time. The structure and operation of the left modulating spool will be described.

Modulating spool 60 has a central chamber 61 with orifices 62 and 63 at either end as shown. At least one orifice (here 63) is preferably contained in a separate replaceable member 64 so that the response characteristics of the modulating spool 60 may be adjusted without redesigning the spool itself. For greatest versatility it is preferred to have both orifices in a separate member. Between the ends of chamber 61, and encircling it, is a land 65. A port 66 is provided to the right of land 65 which connects chamber 61 to an annular recess 67 on the outside of spool 60. A spring 70 urges both spools 60 away from center.

Another and generally smaller port 68 connects chamber 61 to an annular recess 69.

The mode of action of my modulating valve system is best seen by referring to FIGS. 2 through 4, which depict it diagrammatically.

FIG. 2 shows the system "at rest". Both load ports 80 and 81 are connected, via a directional control valve, not shown, to a reservoir or venting condition. When the position of the directional control valve is changed to apply high pressure at port 80 and connect port 81 to reservoir or atmospheric pressure, the high pressure fluid is transmitted into annular recess 67, through port 66 and into chamber 61. At the same time, the pressure also is transmitted directly, via annular recess 67, around the spool 60 and to the load port 82, which is partly but not completely covered by land 65. The pressure at load port 82 thus begins to rise relatively quickly. The magnitude of that pressure will be a function of time; its initial rate of increase will be determined primarily by the effective initial opening size of load port 82.

Very quickly, however, another factor enters in. When chamber 61 is pressurized there is a pressure drop resulting from flow through orifices 62 and 63, but the size of orifice 62 is greater than that of orifice 63. As a result, the pressure drop on the left side of orifice 62 is less than that on the right side of orifice 63, and therefore the pressure on the left side is greater than that on the right. As a result, the spool 60 is urged rightward against central spring 70. As spool 60 moves rightward, land 65 covers more of load port 82 and thereby begins to modulate the pressure increase at that port. The effective rate of modulation, and the time at which it begins, will depend upon the difference in size between orifices 62 and 63, and the load and rate characteristics of opposing spring 70. Those skilled in the art will thus know how these factors can be chosen, either by calculation or empirically, to approximate a desired spool motion under the expected applied pressure.

As spool 60 covers more and more of load port 82, the rate of increase in pressure there falls, and the pressure itself, as a function of time, is less affected by the pressure in annular recess 67. At some point in time, land 65 is centered on load port 82. That point is shown in FIG. 3. From that point on (or from approximately that point if land 65 underlaps or overlaps load port 82), the leading portion of land 65 seals off annular recess 67 from load port 82.

At about the same time, the trailing portion of land 65 clears the wall of load port 82 and opens annular recess 69 to load port 82, beginning a second modulation phase. This phase is governed by the pressure reducing characteristics of port 68, which is usually smaller than orifices 62 and 63.

In an alternate embodiment, shown in FIG. 1A, there is no annular recess 69. Instead, several ports, shown as 68a, 68b and 68c, extend through a long land and communicate directly with load port 82 as the continuing movement of spool 60 brings them opposite load port 82. By an appropriate placement and sizing of these chamber 61 ports the pressure function may be shaped approximately as desired.

The time required for spool 60 to reach its right endpoint of abutment to the other spool 60 as seen in FIG. 4, will be a function of the net force on the spring; the rightward force is determined by the difference in sizes of orifice 62 and 63, but reduced by port 68; the leftward force depends on the characteristics of spring 70. The net rightward force diminishes with time, since compression increases the leftward spring force. When the rightward and leftward forces are balanced the spool stops. It may in fact stop before abutting the right spool 60, as shown in FIG. 4, depending on the input pressure, the spring characteristics and the size of the orifice 63 on the right spool 60.

As pressure equalizes outside of orifices 62 and 63, the rightward force falls, and the spool moves leftward, urged by spring 70. The time required for it to return to its original position depends upon the sizes of orifices 62 and 63 and the load and rate of spring 70. Near the end of the return of spool 60, annular recess 67 is again opened to load port 82, and full pressurization is attained at a rate dependent upon the effective opening at load port 82.

It will be seen by those skilled in the art that the general shape of the modulated pressure curve as a function of time is primarily determined by the size of port 68, or by it and other ports, as in our discussion of an alternate embodiment, and by the width and resting position of land 65 with respect to load port 82. On the other hand, the timing of the various phases of modulation may be adjusted to meet differing needs such as pressure inputs and hydraulic fluid viscosities, by a change in the orifices 62 and 63 and the spring 70, without necessitating redesign of the spool 60 itself.

To achieve desired pressure characteristics in both spools, the initial effective openings at load ports 82 and 83 are designed in accordance with the desired initial pressure rises. The spring load is then chosen to approximate the proper timing and dynamics of spool motion, and orifices 63 are chosen so that the pressure drops into the central chamber are less than the spring load. Orifices 62 are then designed relative to orifices 63 to adjust the timing.

The single spool design is superior to those pressure modulators in which a regulator spool directs flow to a separate modulator spool, because since it is self-regulating, loss of synchronization cannot occur. Moreover, its compactness and simplicity make it especially desirable for applications in which the available space is small and make it easier and more economical to manufacture.

The action on the left side of my modulating valve has been described; it will be clear that the right side functions in the same basic manner. Since the desired pressure application characteristic at load port 83 may differ from that at load port 82, the land and openings on the right side may be different also. If only one pressure port requires modulation, then only one modulating spool need be provided, with the spring fitting into a supporting plug, and with an orifice connected to a tank or reservoir to provide the equivalent of right orifice 63 and port 81.

The invention has been described in detail with particular emphasis on the preferred embodiment thereof, but it should be understood that variations and modifications within the spirit and scope of the invention may occur to those skilled in the art to which the invention pertains.

What is claimed is:

1. Apparatus for modulating pressure delivered from a pressure source to a load in a hydraulic system, comprising a valve body having a generally cylindrical bore therein and having, opening into said bore, a pressure port communicating with said pressure source and a load port communicating with said load;

a spring; and a generally cylindrical valve spool slidingly mounted in said bore and adapted to be urged in a first direction by said spring, toward a first position;

said spool having an interior chamber and having a first and a second orifice on a first and second end, respectively, of said spool, communicating between said chamber and the exterior of said spool, said orifices having relative sizes such that when said interior chamber is at a higher pressure than the exterior of said spool, a pressure difference between said ends of said spool urges said spool in a second direction in opposition to said spring; and toward a second position;

said spool having a land on its exterior outside said interior chamber and between said ends of said spool, having first port means communicating between said interior chamber and said spool exterior between said land and said first end of said spool, and having second port means communicating between said interior chamber and said spool exterior between said land and said second end of said spool.

2. The apparatus of claim 1 and in which said second port means communicates between said pressure port and said chamber while said spool is in said first or second positions or in any intermediate position.

3. The apparatus of claim 1 and in which said land is centered upon said load port at some spool position between said first and said second positions.

4. The apparatus of claim 1 and in which while said spool passes from said first position to said second position, said second port means communicates during a first period of time with said load port and said first port means communicates during a second period of time with said load port.

5. The apparatus of claim 1 and in which while said spool passes from said first position to said second position it reaches a point after which said first port means is in constant communication with said load port.

6. The apparatus of claim 1 and in which said first port means comprises a plurality of ports and while said spool passes from said first position to said second position, at least one of said plurality of ports is not in constant communication with said load port.

7. The apparatus of claim 1 and further comprising a second such valve spool on an end of said spring opposite to said first spool.

* * * * *